United States Patent
Li et al.

(10) Patent No.: US 11,219,878 B2
(45) Date of Patent: Jan. 11, 2022

(54) SORBENT COMPOSITIONS HAVING AMORPHOUS HALOGEN SPECIES FOR THE SEQUESTRATION OF CONTAMINANTS

(71) Applicant: ADA Carbon Solutions, LLC, Littleton, CO (US)

(72) Inventors: Mowen Li, Highlands Ranch, CO (US); Christopher Vizcaino, Littleton, CO (US); Roger H. Cayton, Castle Rock, CO (US); Jacob B. Lowring, Coushatta, LA (US)

(73) Assignee: ADA Carbon Solutions, LLC, Littleton, CO (US)

( * ) Notice: Subject to any disclaimer, the term of this patent is extended or adjusted under 35 U.S.C. 154(b) by 0 days.

(21) Appl. No.: 15/237,089

(22) Filed: Aug. 15, 2016

(65) Prior Publication Data

US 2017/0043316 A1 Feb. 16, 2017

Related U.S. Application Data

(63) Continuation-in-part of application No. 14/826,872, filed on Aug. 14, 2015.

(51) Int. Cl.
| | | |
|---|---|---|
| *B01J 20/20* | (2006.01) | |
| *B01J 20/02* | (2006.01) | |
| *B01J 20/28* | (2006.01) | |
| *B01J 20/32* | (2006.01) | |
| *B01D 53/64* | (2006.01) | |
| *B01D 53/02* | (2006.01) | |
| *B01J 20/10* | (2006.01) | |
| *B01D 53/83* | (2006.01) | |
| *B01D 53/10* | (2006.01) | |

(52) U.S. Cl.
CPC ............ *B01J 20/02* (2013.01); *B01D 53/025* (2013.01); *B01D 53/64* (2013.01); *B01J 20/10* (2013.01); *B01J 20/20* (2013.01); *B01J 20/28016* (2013.01); *B01J 20/28061* (2013.01); *B01J 20/28071* (2013.01); *B01J 20/3204* (2013.01); *B01J 20/3234* (2013.01); *B01J 20/3293* (2013.01); *B01D 53/10* (2013.01); *B01D 53/83* (2013.01); *B01D 2251/108* (2013.01); *B01D 2253/102* (2013.01); *B01D 2257/602* (2013.01); *B01D 2258/0283* (2013.01)

(58) Field of Classification Search
CPC ............ B01J 20/02; B01J 20/20; B01J 20/10
See application file for complete search history.

(56) References Cited

U.S. PATENT DOCUMENTS

| | | | |
|---|---|---|---|
| 3,803,803 A | 4/1974 | Raduly et al. | |
| 3,873,581 A | 3/1975 | Fitzpatrick et al. | |
| 4,199,472 A | 4/1980 | Ohtsuka et al. | |
| 4,500,327 A | 2/1985 | Nishino et al. | |
| 4,677,096 A | 6/1987 | van der Smissen | |
| 4,747,855 A | 5/1988 | Hirai et al. | |
| 5,080,799 A | 1/1992 | Yan | |
| 5,231,063 A * | 7/1993 | Fukumoto ............... | B01D 53/02 252/190 |
| 5,372,619 A | 12/1994 | Greinke et al. | |
| 6,064,560 A | 5/2000 | Hirahara et al. | |
| 6,514,907 B2 * | 2/2003 | Tsutsumi ............... | C01B 32/372 502/416 |
| 7,722,843 B1 | 5/2010 | Srinivasachar | |
| 8,080,088 B1 | 12/2011 | Srinivasachar | |
| 8,309,046 B2 | 11/2012 | Pollack et al. | |
| 8,524,186 B2 * | 9/2013 | Kawamura ........ | B01D 53/8609 423/242.2 |
| 8,551,431 B1 | 10/2013 | Adams et al. | |
| 9,314,767 B2 | 4/2016 | McMurray et al. | |
| 9,468,904 B2 | 10/2016 | McMurray et al. | |
| 9,539,538 B2 | 1/2017 | Wong et al. | |
| 9,561,462 B2 | 2/2017 | McMurray et al. | |
| 10,035,126 B2 | 7/2018 | McMurray et al. | |
| 10,137,403 B2 | 11/2018 | McMurray et al. | |
| 10,159,928 B2 | 12/2018 | McMurray | |
| 10,307,706 B2 | 6/2019 | Li et al. | |
| 10,421,037 B2 | 9/2019 | Li et al. | |
| 10,449,492 B2 | 10/2019 | Huston et al. | |
| 2001/0002387 A1 | 5/2001 | Tsutsumi et al. | |

(Continued)

FOREIGN PATENT DOCUMENTS

| | | |
|---|---|---|
| CA | 1242684 A | 10/1988 |
| CA | 2090271 A1 | 8/1993 |

(Continued)

OTHER PUBLICATIONS

Office Action dated Aug. 10, 2018 for Chinese Patent Application No. 201610671310.5.

(Continued)

*Primary Examiner* — Stuart L Hendrickson
(74) *Attorney, Agent, or Firm* — Sheridan Ross P.C.

(57) ABSTRACT

Methods for the manufacture of sorbent compositions, sorbent compositions and methods for using the sorbent compositions. The methods include the utilization of an acidic halogen solution as a source of a halogen species that is dispersed on a solid sorbent. The use of the acidic halogen solution results in a highly active halogen species that demonstrates improved efficacy for the removal of heavy metal(s) from a flue gas. The sorbent composition includes a substantially amorphous halogen species associated with a solid sorbent such as powdered activated carbon (PAC).

38 Claims, 3 Drawing Sheets

(56) References Cited

U.S. PATENT DOCUMENTS

| | | |
|---|---|---|
| 2002/0198097 A1 | 12/2002 | El-Shoubary et al. |
| 2005/0039598 A1 | 2/2005 | Srinivasachar et al. |
| 2007/0123419 A1 | 5/2007 | Le Bec |
| 2007/0254807 A1 | 11/2007 | Bisque et al. |
| 2009/0007785 A1 | 1/2009 | Kimura et al. |
| 2009/0111690 A1 | 4/2009 | Gadkarec et al. |
| 2011/0172091 A1 | 7/2011 | Sugimoto et al. |
| 2013/0109562 A1* | 5/2013 | Wong ............... B01D 53/64 502/181 |
| 2013/0157845 A1* | 6/2013 | Nalepa ............. B01D 53/64 502/401 |
| 2014/0186625 A1 | 7/2014 | Wong et al. |
| 2014/0191157 A1 | 7/2014 | Wong et al. |
| 2015/0165416 A1 | 6/2015 | Wong et al. |
| 2015/0235326 A1 | 8/2015 | Hansen et al. |
| 2015/0343378 A1 | 12/2015 | Huston et al. |
| 2016/0214078 A1 | 7/2016 | Li et al. |
| 2016/0296908 A1 | 10/2016 | Li et al. |
| 2017/0043321 A1 | 2/2017 | Li et al. |
| 2018/0001257 A1 | 1/2018 | Wong et al. |
| 2018/0028970 A1 | 2/2018 | Huston et al. |
| 2018/0028971 A1 | 2/2018 | Huston et al. |
| 2018/0029006 A1 | 2/2018 | Li et al. |
| 2018/0029008 A1 | 2/2018 | Li et al. |
| 2018/0029009 A1 | 2/2018 | Li et al. |
| 2018/0170773 A1 | 6/2018 | Mitchek et al. |
| 2019/0291041 A1 | 9/2019 | McMurray et al. |
| 2019/0358578 A1 | 11/2019 | McMurray et al. |
| 2020/0001228 A1 | 1/2020 | Li et al. |
| 2020/0047107 A1 | 2/2020 | Cayton |

FOREIGN PATENT DOCUMENTS

| | | |
|---|---|---|
| CA | 2805819 A1 | 3/2012 |
| CN | 101829543 A | 9/2010 |
| CN | 101977685 A | 2/2011 |
| CN | 103480336 A | 1/2014 |
| CN | 106466590 A | 3/2017 |

OTHER PUBLICATIONS

Office Action dated Oct. 2, 2018 for Canadian Patent Application No. 2,939,597.
Office Action dated Jan. 17, 2019 for U.S. Appl. No. 14/826,872.
Notice of Allowance dated Nov. 1, 2018 for U.S. Appl. No. 15/729,414.
Office Action (Restriction Requirement) dated Oct. 6, 2016 for U.S. Appl. No. 14/721,623.
Office Action (Restriction Requirement) dated Mar. 23, 2017 for U.S. Appl. No. 14/721,623.
Office Action dated Oct. 6, 2017 for U.S. Appl. No. 14/721,623.
Final Office Action dated May 10, 2018 for U.S. Appl. No. 14/721,623.
Office Action dated Nov. 28, 2018 for U.S. Appl. No. 14/721,623.
Office Action dated Apr. 5, 2018 for U.S. Appl. No. 15/729,308.
Notice of Allowance dated Nov. 21, 2018 for U.S. Appl. No. 15/729,308.
Office Action dated Mar. 6, 2019 for U.S. Appl. No. 15/729,308.
Office Action dated Feb. 9, 2018 for U.S. Appl. No. 15/729,414.
Notice of Allowance dated Jul. 23, 2018 for U.S. Appl. No. 15/729,414.
Office action dated Feb. 25, 2019 for U.S. Appl. No. 15/729,414.
Office Action dated May 25, 2017 for Canadian Patent Application No. 2,939,597.
Office Action dated Jan. 26, 2018 for Canadian Patent Application No. 2,939,597.
Office Action dated Nov. 22, 2016 for U.S. Appl. No. 14/826,872.
Office Action dated Oct. 12, 2017 for U.S. Appl. No. 14/826,872.
Office Action dated May 14, 2018 for U.S. Appl. No. 14/826,872.
U.S. Appl. No. 16/657,634, filed Oct. 18, 2019, Huston et al.
U.S. Appl. No. 16/725,993, filed Dec. 23, 2019, Huston et al.
Office Action dated Jul. 2, 2019 for Chinese Patent Application No. 201610671310.5, 11 pages.
Final Action for U.S. Appl. No. 14/826,872, dated Jul. 31, 2019 5 pages.
Office Action for U.S. Appl. No. 15/729,347, dated Apr. 29, 2019 7 pages.
Final Action for U.S. Appl. No. 15/729,347, dated Jan. 28, 2019 4 pages.
U.S. Appl. No. 15/930,145, filed May 12, 2020, Li et al.
U.S. Appl. No. 16/911,161, filed Jun. 24, 2020, Wong et al.
Official Action for U.S. Appl. No. 15/729,347, dated May 22, 2020 4 pages.
Official Action for U.S. Appl. No. 14/826,872, dated Mar. 23, 2020 4 pages.
Office Action (English translation) for Chinese Patent Application No. 201610671310.5, dated Sep. 3, 2020, 6 pages.
Final Action for U.S. Appl. No. 14/826,872, dated Sep. 14, 2020 4 pages.
Office Action (English translation) for Chinese Patent Application No. 201610671310.5, dated Apr. 29, 2020, 10 pages.
Notice of Allowance for U.S. Appl. No. 15/729,347, dated Dec. 7, 2020 5 pages.
Final Action for U.S. Appl. No. 14/826,872, dated Jul. 28, 2021 3 pages.
Notice of Allowance (English translation) for Chinese Patent Application No. 201610671310.5, dated Dec. 31, 2020, 5 pages.
Banach et al., "A chemical method of the production of "heavy" sodium tripolyphosphate with the high content of Form 1 or Form II," Polish Journal of Chemical Technology, 2009, vol. 11 (2), pp. 13-20.
Official Action for U.S. Appl. No. 14/826,872, dated Mar. 23, 2021 5 pages.

* cited by examiner

SORBENT COMPOSITIONS HAVING AMORPHOUS HALOGEN SPECIES FOR THE SEQUESTRATION OF CONTAMINANTS

CROSS-REFERENCE TO RELATED APPLICATIONS

This application claims the priority benefit as a continuation-in-part application of U.S. patent application Ser. No. 14/826,872 filed on Aug. 14, 2015, which is incorporated herein by reference in its entirety.

FIELD

This disclosure relates to the field of sorbent compositions for the sequestration of contaminants from a fluid, such as for the sequestration of heavy metals from a flue gas stream.

BACKGROUND

Stricter regulations for the reduction of mercury emissions from, e.g., coal fired boilers necessitate the development of improved sorbent materials to sequester mercury and remove it from discharge streams to at least the level required to meet regulatory limits. One such sorbent material is based on powdered activated carbon (PAC), and there is a need to improve the ability of the sorbent to affect higher levels of mercury capture from flue gas streams. The injection of halogens with the coal or the addition of halogen salts such as halide salts to the surface of a sorbent has been demonstrated to enhance mercury capture in this regard.

Thus, the use of a halogen in sorbent compositions is a leading technology used to oxidize mercury to a form that can be captured, such as is disclosed in U. S. Patent Application Publication 2013/0109562 by Wong et al., which is incorporated herein by reference in its entirety. In some cases, the sorbent compositions include 10 wt. % or more of the halogen. In some cases the halogen is added separately from the sorbent, as in U.S. Pat. No. 8,309,046 to Pollack et al. which is also incorporated herein by reference in its entirety.

SUMMARY

The addition of a halogen salt for the sequestration of mercury, e.g., adding a halide salt to the sorbent composition, presumably enhances the oxidation of elemental gas phase mercury to a cationic species that is more strongly sequestered in the pores of the sorbent. It is believed, however, that the degree of mercury oxidation and sequestration is limited by the reactivity of the halogen salts. It is believed that halogen salt reactivity towards mercury oxidation may be limited by various aspects of the salt such as composition, crystallite size/surface area, volatility, location within the sorbent pore network, poisoning from flue gas constituents such as acid gases (e.g., $SO_3$ and $NO_2$) and/or the bonding strength of the active halogen moiety to the sorbent surface.

It has been found that the use of an amorphous (e.g., non-crystalline) halogen in association with a solid sorbent yields a unique sorbent composition that demonstrates enhanced heavy metal removal from a flue gas stream compared to the same base sorbent treated with a halide salt in substantially crystalline form. In particular, it has been found that utilizing an acidic halogen solution that includes a halogen species and an acid to form the sorbent composition results in significantly improved sequestration of heavy metals (e.g., mercury) as compared to a similar sorbent composition that is prepared using conventional methods. This approach is believed to be effective for a wide range of acids, halide salts, and sorbents.

In one embodiment, a method for the manufacture of a sorbent composition is disclosed. The method includes the step of contacting a solid sorbent with an acidic halogen solution, the acidic halogen solution comprising an acid and a halogen species derived from a halide salt. The contacting step forms a sorbent composition comprising the solid sorbent and the halogen species.

A number of characterizations, refinements and additional features are applicable to this embodiment of a method for the manufacture of a sorbent composition. These characterizations, refinements and additional features are applicable to this embodiment of a method for the manufacture of a sorbent composition individually or in any combination.

In one characterization, the acidic halogen solution comprises a mineral acid. For example, the mineral acid may be selected from the group consisting of sulfuric acid, phosphoric acid, nitric acid, hydrochloric acid and combinations thereof. In one particular characterization, the mineral acid comprises sulfuric acid. In another particular characterization, the mineral acid comprises phosphoric acid.

In another characterization, the halogen species comprises a halogen that is selected from the group consisting of bromine, chlorine, iodine and combinations thereof. In a further characterization, the halide salt comprises a halogen anion and a cation selected from the group consisting of lithium, sodium, potassium, calcium, magnesium, ammonium, alkyl ammonium, hydrogen and combinations thereof. For example, the halogen species may comprise bromine, and the halide salt may be selected from the group consisting of sodium bromide, ammonium bromide and combinations thereof.

The solid sorbent may be selected from the group consisting of silica, silicates, carbonaceous materials, and combinations thereof. In certain characterizations, the solid sorbent comprises a carbonaceous material. In a further refinement of this characterization, the carbonaceous material is derived from coal, and may be derived from lignite coal. In one refinement, the solid sorbent comprises powdered activated carbon.

In certain characterizations, it is desirable that the median average particle size (D50) of the sorbent composition (e.g., of the solid sorbent) is relatively small. In one characterization, the solid sorbent has a median average particle size (D50) of not greater than about 25 µm. In another characterization, the solid sorbent has a relatively high total pore volume. In one characterization, the solid sorbent has a total pore volume of at least about 0.2 cc/g. In another characterization, the solid sorbent has a relatively high total surface area. In one characterization, the solid sorbent has a surface area of at least about 350 $m^2/g$.

The step of contacting the solid sorbent with the acidic halogen solution may be carried out using a number of techniques. In one characterization, the method includes the step of forming the acidic halogen solution comprising the halogen species before contacting the solid sorbent with the acidic halogen solution. In one characterization, the step of forming the acidic halogen solution comprises dissolving the halide salt in an aqueous solvent to form an aqueous halide salt solution, and thereafter combining the acid with the aqueous halide salt solution. In one characterization, the contacting step includes spraying the acidic halogen solution onto the solid sorbent. In any event, the molar ratio of halogen species to acid in the acidic halogen solution may be not greater than about 10:1, such as not greater than about 8:1, such as not greater than about 5:1, or even not greater than about 2:1. In another characterization, the molar ratio of halogen species to acid in the acidic halogen solution is at least about 1:2.

In a further characterization, the step of contacting the solid sorbent with the acidic halogen solution includes the steps of dispersing the halide salt onto the solid sorbent, and thereafter contacting the halide salt and the solid sorbent with the acid to form the acidic halogen solution comprising the acid and the halogen species on the solid sorbent. In one refinement, the step of dispersing the halide salt onto the solid sorbent includes admixing dry particulates of the halide salt with the solid sorbent. In another refinement, the step of dispersing the halide salt onto the solid sorbent comprises contacting a substantially non-acidic halogen solution of the halide salt with the solid sorbent.

In another characterization, the step of contacting the solid sorbent with the acidic halogen solution includes the steps of contacting the solid sorbent with the acid to form an acid-treated solid sorbent and dispersing the halide salt onto the acid-treated solid sorbent to form the acidic halogen solution. In one refinement, the step of dispersing the halide salt onto the acid-treated solid sorbent comprises admixing dry particulates of the halide salt with the acid-treated solid sorbent. In another refinement, the step of dispersing the halide salt onto the acid-treated solid sorbent comprises contacting a substantially non-acidic halogen solution of the halide salt with the acid-treated solid sorbent.

In another characterization, the method further includes the step of adding at least a second halide salt to the solid sorbent.

In another characterization, the sorbent composition includes not greater than about 30 wt. % of the halogen species. In yet another characterization, the sorbent composition includes at least about 0.5 wt. % of the halogen species.

In another characterization, the method further includes the step of adding an acid gas agent to the sorbent composition. In another characterization, the method further includes the step of adding a flow aid to the sorbent composition.

In another embodiment, a sorbent composition is disclosed. The sorbent composition includes a solid sorbent and a halogen species associated with the solid sorbent, wherein the halogen species is in a substantially amorphous form on the solid sorbent.

A number of characterizations, refinements and additional features are applicable to this embodiment of a sorbent composition. These characterizations, refinements and additional features are applicable to this embodiment of a sorbent composition individually or in any combination.

In one characterization, the sorbent composition is formed by the method described above. For example, the halogen species may be derived by contacting at least a first halide salt with an acid. In one refinement, the halogen species associated with the solid sorbent is dispersed within the acid. In another refinement, the acid is a mineral acid, such as a mineral acid selected from the group consisting of sulfuric acid, phosphoric acid, nitric acid, hydrochloric acid and combinations thereof. In yet a further refinement, the sorbent composition comprises a conjugate salt of the mineral acid. In yet a further refinement, the sorbent composition comprises an anion selected from the group consisting of sulfate, bisulfate, phosphate, hydrogen phosphate, dihydrogen phosphate, nitrate, chloride anions, and combinations thereof. For example, the mineral acid may comprise sulfuric acid, and the sorbent composition may comprise a polyatomic anion selected from the group consisting of sulfate, bisulfate and combinations thereof. In another example, the mineral acid comprises phosphoric acid and the sorbent composition comprises a polyatomic anion selected from the group consisting of phosphate, hydrogen phosphate, dihydrogen phosphate and combinations thereof.

In another characterization, the halogen species is selected from the group consisting of bromine, chlorine, iodine and combinations thereof. For example, in one characterization, when the halogen species is derived by contacting at least a first halide salt with an acid, the first halide salt comprises a halogen anion and a cation selected from the group consisting of lithium, sodium, potassium, calcium, magnesium, ammonium, alkyl ammonium, hydrogen and combinations thereof.

In another characterization, the halogen species comprises bromine. For example, when the halogen species is derived by contacting at least a first halide salt with an acid, the first halide salt may be selected from the group consisting of sodium bromide, ammonium bromide and combinations thereof.

In another characterization, the sorbent composition comprises at least about 0.5 wt. % of the halogen species. In one refinement, the sorbent composition comprises at least about 5 wt. % of the halogen species. In another characterization, the sorbent composition comprises not greater than about 30 wt. % of the halogen species, and in one refinement the sorbent composition comprises not greater than about 15 wt. % of the halogen species.

In another characterization, the sorbent composition comprises at least about 3 wt. % moisture, and in one refinement the sorbent composition comprises at least about 8 wt. % moisture. In another characterization, the sorbent composition comprises not greater than about 15 wt. % moisture.

In another characterization of the sorbent composition, the solid sorbent is selected from the group consisting of alumina, silica, silicates, carbonaceous materials, and combinations thereof. In one refinement, the solid sorbent comprises a carbonaceous material, for example wherein the carbonaceous material is derived from coal. In one particular refinement, the carbonaceous material is derived from lignite coal. In another refinement, the solid sorbent comprises powdered activated carbon.

In a further characterization of the sorbent composition, the solid sorbent has a median average particle size (D50) of not greater than about 30 μm, and in a further refinement of this characterization the solid sorbent has a median average particle size of not greater than about 15 μm. In another characterization of the sorbent composition, the solid sorbent has a total pore volume of at least about 0.2 cc/g. In another characterization of the sorbent composition, the solid sorbent has a surface area of at least about 350 m$^2$/g.

In yet another characterization, the sorbent composition further comprises at least a second halogen species associated with the solid sorbent. In yet a further characterization, the sorbent composition further comprises an acid gas agent. For example, the acid gas agent may be selected from the group consisting of aluminum hydroxide, zinc oxide, ammonium sulfate, ammonium bisulfate, ammonium carbonate, ammonium bicarbonate, sodium carbonate, sodium bicarbonate, magnesium hydroxide, magnesium carbonate, magnesium bicarbonate, urea, urea derivatives, metal hydroxides, ammonium compounds, and combinations thereof. In one particular characterization, the acid gas agent comprises aluminum hydroxide. In one refinement, the sorbent composition comprises at least about 1 wt. % of the acid gas agent and not greater than about 20 wt. % of the acid gas agent.

In another characterization, the sorbent composition further comprises a flow aid. In one refinement, the flow aid is selected from the group consisting of graphite, mica, talc, silica, stearates, clays, diatomaceous earth and combinations thereof. In one particular refinement, the flow aid comprises graphite. In another particular refinement, the flow aid comprises mica.

In another embodiment, a method for the treatment of a flue gas stream to remove contaminants from the flue gas stream is disclosed. The method may include combusting a fuel, the combusting of the fuel generating a flue gas stream comprising at least one contaminant contained in the flue gas stream. The flue gas stream is contacted with a solid sorbent composition, wherein the contacting oxidizes at least a portion of the at least one contaminant to form an oxidized contaminant. After the contacting step, the solid sorbent composition is separated from the flue gas stream. The solid sorbent composition a comprises solid sorbent and a halogen species associated with the solid sorbent, wherein the halogen species is in a substantially amorphous form on the solid sorbent, and wherein the solid sorbent sequesters the oxidized contaminant.

A number of characterizations, refinements and additional features are applicable to this embodiment of a method for the treatment of a flue gas stream to remove contaminants from the flue gas stream. These characterizations, refinements and additional features are applicable to this embodiment of a method for treatment of a flue gas stream to remove contaminants from the flue gas stream individually or in any combination.

In one characterization, the halogen species is formed by contacting at least a first halide salt with an acid. In one refinement, the halogen species associated with the solid sorbent is dispersed within the acid. The acid may be a mineral acid, such as a mineral acid selected from the group consisting of sulfuric acid, phosphoric acid, nitric acid, hydrochloric acid and combinations thereof. In this regard, the sorbent composition may include a conjugate salt of the mineral acid. In another characterization, the sorbent composition comprises an anion selected from the group consisting of sulfate, bisulfate, phosphate, hydrogen phosphate, dihydrogen phosphate, nitrate, chloride, and combinations thereof. In one particular refinement, the mineral acid comprises sulfuric acid. In this refinement, the sorbent composition may include a polyatomic anion selected from the group consisting of sulfate, bisulfate and combinations thereof. In another characterization, the mineral acid comprises phosphoric acid. In this refinement, the sorbent composition may include a polyatomic anion selected from the group consisting of phosphate, hydrogen phosphate, dihydrogen phosphate and combinations thereof.

In another characterization of the method for the treatment of a flue gas stream to remove contaminants from the flue gas stream, the halogen species is selected from the group consisting of bromine, chlorine, iodine and combinations thereof. When the halogen species is formed by contacting at least a first halide salt with an acid, the first halide salt may include a halogen anion and a cation selected from the group consisting of lithium, sodium, potassium, calcium, magnesium, ammonium, alkyl ammonium, hydrogen and combinations thereof.

In another characterization, the halogen species comprises bromine. When the halogen species is formed by contacting at least a first halide salt with an acid, the first halide salt may be selected from the group consisting of sodium bromide, ammonium bromide and combinations thereof.

In another characterization, the sorbent composition comprises at least about 0.5 wt. % of the halogen species, and in one particular refinement the sorbent composition comprises at least about 5 wt. % of the halogen species. In another characterization, the sorbent composition comprises not greater than about 30 wt. % of the halogen species, an in one particular refinement the sorbent composition includes not greater than about 15 wt. % of the halogen species.

In another characterization of the method for the treatment of a flue gas stream to remove contaminants from the flue gas stream, the sorbent composition comprises at least about 3 wt. % moisture, and in one particular refinement the sorbent composition comprises at least about 8 wt. % moisture. In another characterization, the sorbent composition comprises not greater than about 15 wt. % moisture.

In another characterization of the method for the treatment of a flue gas stream to remove contaminants from the flue gas stream, the solid sorbent is selected from the group consisting of alumina, silica, silicates, carbonaceous materials, and combinations thereof. In one particular refinement, the solid sorbent comprises a carbonaceous material. In another particular refinement, the carbonaceous material is derived from coal, for example from lignite coal. In one refinement, the solid sorbent includes powdered activated carbon.

In a further characterization of the method for the treatment of a flue gas stream to remove contaminants from the flue gas stream, the solid sorbent has a median average particle size of not greater than about 30 µm, and in a further refinement of this characterization the solid sorbent has a median average particle size of not greater than about 15 µm. In another characterization of the sorbent composition, the solid sorbent has a total pore volume of at least about 0.2 cc/g. In another characterization of the sorbent composition, the solid sorbent has a surface area of at least about 350 $m^2/g$.

In yet another characterization, the sorbent composition further comprises at least a second halogen species associated with the solid sorbent. In yet a further characterization, the sorbent composition further comprises an acid gas agent. For example, the acid gas agent may be selected from the group consisting of aluminum hydroxide, zinc oxide, ammonium sulfate, ammonium bisulfate, ammonium carbonate, ammonium bicarbonate, sodium carbonate, sodium bicarbonate, magnesium hydroxide, magnesium carbonate, magnesium bicarbonate, urea, urea derivatives, metal hydroxides, ammonium compounds, and combinations thereof. In one particular characterization, the acid gas agent comprises aluminum hydroxide. In one refinement, the sorbent composition comprises at least about 1 wt. % of the acid gas agent and not greater than about 20 wt. % of the acid gas agent.

In another characterization, the sorbent composition further comprises a flow aid. In one refinement, the flow aid is selected from the group consisting of graphite, mica, talc, silica, stearates, clays, diatomaceous earth and combinations thereof. In one particular refinement, the flow aid comprises graphite. In another particular refinement, the flow aid comprises mica.

In yet another refinement, the at least one contaminant is mercury.

Additional embodiments, as well as characterizations and refinements of these embodiments will be apparent to those of ordinary skill in the art upon review of the following description and the appended claims.

DETAILED DESCRIPTION

Figure 1:
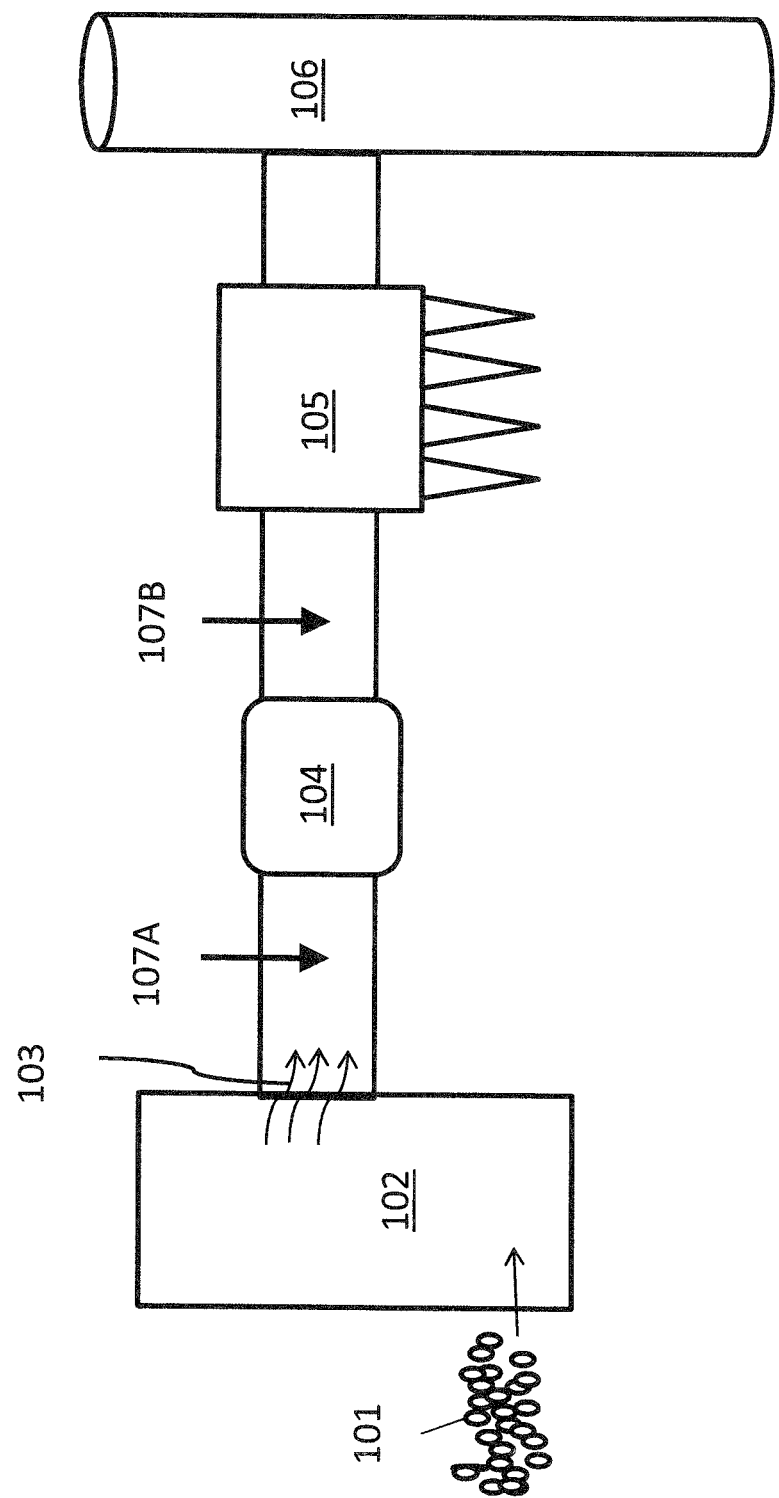
FIG. 1 illustrates a schematic of a flue gas train and method for the treatment of a flue gas for the removal of contaminants according to one embodiment of this disclosure.

In one embodiment, a method for the manufacture of a sorbent composition is disclosed. The method may include the step of contacting a solid sorbent with an acidic halogen solution, where the acidic halogen solution includes an acid and a halogen species derived from a halide salt, to form a sorbent composition that includes the solid sorbent and the halogen species.

It is generally known that a halogen (e.g., bromine) facilitates the oxidation of mercury during the capture and sequestration of mercury by a sorbent (e.g., powdered activated carbon). However, halogens may have some detrimental effects on the processing equipment. Therefore, it is desirable to obtain the oxidation benefits of the halogen while using as little of the halogen as reasonably possible.

It has unexpectedly been found that when the halogen species is derived from a halide salt and the halogen species is in the presence of an acid, the oxidation performance of the halogen species is increased. The halogen species in the presence of an acid is sometimes referred to herein as an acid activated halogen species, it being understood that the term "acid activated" does not refer to any specific mechanism or theory behind the increased oxidation performance of the halogen species.

Numerous acids may be utilized in accordance with the foregoing method. The acid may be an organic acid or an inorganic acid. When an organic acid is employed, the organic acid should be a relatively strong acid (i.e., with a relatively low acid dissociation constant), such as pKa<2, e.g., oxalic acid (p$K_a$=1.2). Although organic acids may be useful, it is believed to be more desirable to use a mineral acid (i.e., an inorganic acid) as the acid, and a wide variety of mineral acids may be useful in the present method. For example, the mineral acid may be selected from, but is not limited to, the group consisting of sulfuric acid ($H_2SO_4$), phosphoric acid ($H_3PO_4$), nitric acid ($HNO_3$), hydrochloric acid (HCl), as well as mixtures of these acids and other mineral acids. Particularly useful acids for this method include sulfuric acid and phosphoric acid. In one particular characterization, the acid comprises phosphoric acid.

A variety of halogens may be used in this method. For example, the halogen species may include a halogen that is selected from, but is not limited to, the group consisting of bromine, chlorine and iodine, including combinations thereof. In one characterization, bromine may be particularly effective as the halogen. In another characterization, iodine is utilized as the halogen. Among the possible combinations, it may be particularly effective to utilize both bromine and iodine as the halogens. The term halogen species includes simple ionic forms of these elements (e.g., halide salts) as well as complex forms of the halogen such as oxyanion salts (e.g., bromate).

As is noted above, the acid activated halogen species is derived from a halogen salt, e.g. from a compound that includes a halogen anion and a cation. The cation may be a single element, e.g., where the cation is selected from the group consisting of lithium, sodium, potassium, calcium, magnesium, hydrogen and combinations of these cations. The cation may also be a complex cation, such as where the cation comprises ammonium or alkyl ammonium. In one particular characterization, the acid activated halogen species comprises bromine, and the halide salt is selected from the group consisting of sodium bromide (NaBr) and ammonium bromide ($NH_4Br$), and combinations of the two. In another particular characterization, the acid activated halogen species comprises iodine, and the halide salt comprises potassium iodide (KI).

The solid sorbent may be selected from the group consisting of silica, silicates and carbonaceous materials, and combinations of these sorbent materials. In a particular embodiment, the solid sorbent comprises a carbonaceous material. For example, the carbonaceous material may be derived from coal, and in particular may be derived from lignite coal. In another characterization, the solid sorbent may comprise powdered activated carbon (PAC). The PAC may be formed from a variety of carbon sources such as wood, coconut shells and the like. In one particular embodiment, the solid sorbent comprises PAC that has been derived from coal. PAC derived from coal may have many advantageous morphological properties, such as high surface area, high overall porosity and desirable pore size characteristics that are advantageous for the sequestration of mercury.

The median average particle size (D50) of the solid sorbent may be relatively small, particularly when the sorbent composition is engineered for the capture of mercury or other heavy metal contaminants from a flue gas stream. In one characterization, the median average particle size of the solid sorbent is not greater than about 50 μm, such as not greater than about 30 μm, or even not greater than about 25 μm. Particularly for the sequestration of mercury from a flue gas stream, it may be desirable to utilize a solid sorbent having a median average particle size of not greater than about 20 μm, not greater than about 15 μm and even not greater than about 12 μm. Characterized in another way, the median particle size may be at least about 5 μm, such as at least about 6 μm, or even at least about 8 μm. The D50 median average particle size may be measured using techniques such as light scattering techniques (e.g., using a Saturn DigiSizer II, available from Micromeritics Instrument Corporation, Norcross, Ga.).

In one characterization, the solid sorbent (e.g., PAC) has a relatively high total pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

In this regard, the total pore volume of the solid sorbent (sum of micropore volume plus mesopore volume plus macropore volume) may be at least about 0.10 cc/g, such as at least 0.20 cc/g, at least about 0.25 cc/g or even at least about 0.30 cc/g. The micropore volume of the sorbent may be at least about 0.10 cc/g, such as at least about 0.15 cc/g. Further, the mesopore volume of the sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume may advantageously enable efficient capture and sequestration of oxidized mercury species by the solid sorbent. Pore volumes may be measured using gas adsorption techniques (e.g., $N_2$ adsorption) using instruments such as a TriStar II Surface Area Analyzer 3020 or ASAP 2020 (Micromeritics Instruments Corporation, Norcross, Ga., USA).

In another characterization, the solid sorbent has a relatively high surface area. For example, the solid sorbent may have a surface area of at least about 350 $m^2$/g, such as at least about 400 $m^2$/g or even at least about 500 $m^2$/g. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material. BET surface area may be measured using the Micromeritics TriStar II 3020 or ASAP 2020 (Micromeritics Instrument Corporation, Norcross, Ga.).

In accordance with this method for the manufacture of a sorbent composition, the acidic halogen solution, which includes an acid and a halogen species, is contacted with the solid sorbent to form the sorbent composition. The acidic halogen solution may be contacted with the solid sorbent in a variety of ways. For example, the acidic halogen solution may be formed before contact with the solid sorbent, or the acidic halogen solution may be formed on the solid sorbent, e.g., by the separate addition of the acid and the halogen species to the sorbent.

Thus, in one characterization, the acidic halogen solution comprising the halogen species is formed before the step of contacting the acidic halogen solution with the sorbent. In one characterization, the step of forming the acidic halogen solution comprises dissolving the halide salt in an aqueous solvent (e.g., water) to form an aqueous halide salt solution, and thereafter combining the acid with the halide salt solution to form the acidic halogen solution. Alternatively, a barren acidic solution (i.e., an acidic solution that is substantially free from halogens) may first be formed, and then the halide salt may be added to the barren acidic solution to form the acidic halogen solution comprising the halogen species.

The thus-formed acidic halogen solution may be contacted with the sorbent, e.g., to coat the sorbent with the acidic halogen solution and disperse the halogen species onto the sorbent. For example, the sorbent may be immersed in the acidic halogen solution for a period of time and then separated from the solution, or the acidic halogen solution may be sprayed onto the sorbent. It is believed to be beneficial to control the relative amounts of acid and halogen species in the acidic halogen solution. For example, the molar ratio of halogen species to acid in the acidic halogen solution may be not greater than about 10:1, such as not greater than about 8:1, not greater than about 5:1, or even not greater than about 2:1. However, the molar ratio of halogen species to acid in the acidic halogen solution may be at least about 1:2.

In another embodiment, the step of contacting the solid sorbent with the acidic halogen solution may include dispersing the halide salt onto the solid sorbent, and then contacting the halide salt and the solid sorbent with the acid (e.g., without a halogen species) to form, on the solid sorbent, the acidic halogen solution comprising the acid and the halogen species. For example, the halide salt may be dispersed onto the solid sorbent by admixing substantially dry particulates of the halide salt with the solid sorbent. Alternatively, a solution of the halide salt, e.g., where the halide salt is wholly or partially solubilized in an aqueous solution, may be contacted with the solid sorbent to disperse the halide salt onto the sorbent.

In another embodiment, the step of contacting the solid sorbent with the acidic halogen solution includes first contacting the solid sorbent with the acid to form an acid-treated solid sorbent, and then dispersing the halide salt onto the acid-treated solid sorbent to form, on the solid sorbent, the acidic halogen solution comprising the acid and the halogen species. In this embodiment, the step of dispersing the halide salt onto the acid-treated solid sorbent may include admixing dry particulates of the halide salt with the acid-treated solid sorbent, or may include contacting a solution (e.g., substantially non-acidic aqueous) of the halide salt with the acid-treated solid sorbent.

Any of the foregoing approaches for contacting the solid sorbent with the acidic halogen solution may be applied individually, or in any combination. For example, an acidic halogen solution comprising a halogen species may be contacted with a solid sorbent that already has some concentration of a halide salt associated with the sorbent, e.g., dispersed on the sorbent. In such an example, the halogen species in the acidic halogen solution may be the same as the halogen contained in the halide salt, or may be a different halogen. In another example, the method may also include adding at least a second halide salt to the solid sorbent, e.g., before or after the acidic halogen solution comprising the halogen species is contacted with the solid sorbent. In one embodiment, an acidic halogen solution is contacted with the sorbent to deposit a first halogen species onto the sorbent. Thereafter, a second halogen species that is different than the first halogen species is contacted with the acid activated sorbent, where the second halogen species is solubilized in an acid, or is solubilized in a substantially non-acidic solution. In one example, a sorbent is contacted with an acidic halogen solution (e.g., a solution of sodium bromide in phosphoric acid) and thereafter the sorbent is contacted with a solution of a second halogen species that is not acid activated (e.g., a solution of potassium iodide in water).

In one refinement of the foregoing method, the method may include drying of the sorbent composition, e.g., drying the sorbent composition after contacting the solid sorbent with the acidic halogen solution. This drying step may be applied to reduce the moisture level to a desired range, for example. In one characterization, the drying step includes drying the sorbent composition to achieve a moisture level of not greater than about 8 wt. %.

In any event, it is an advantage of the methods and compositions disclosed herein that the sorbent compositions may have an adequate efficacy (e.g., for mercury removal from a flue gas stream) at relatively low concentrations of the halogen species. Characterized another way, at the same concentration of halogen species, the sorbent compositions disclosed herein may have an improved efficacy in relation to known sorbents, i.e., sorbents where the halide salt has not been exposed to an acid. In one example, the method forms a sorbent composition that includes not greater than about 30 wt. % of the halogen species, such as not greater than about 20 wt. % of the halogen species, not greater than about 15 wt. % of the halogen species, and even not greater than about 12 wt. % of the halogen species, such as not greater than about 10 wt. % of the halogen species. However, for most applications, the method will form a sorbent composition that includes at least about 0.5 wt. % of the halogen species, such as at least about 1.0 wt. % of the halogen species, at least about 2.0 wt. % of the halogen species, or even at least about 3.0 wt. % of the halogen species. In one embodiment, the halogen species includes iodine and the sorbent composition includes not greater than about 5 wt. % iodine, such as not greater than about 4 wt. % iodine and even not greater than about 3 wt. % iodine. It has been found that iodine, particularly acid-activated iodine as disclosed herein, can have a high degree of efficacy even in such low concentrations in the sorbent.

Because the type and nature of the halogen species may vary, it is also useful to consider the concentration of the halogen species in terms of the molar concentration of the halogen. In this regard, the method may form a sorbent composition that includes not greater than about 0.375 mol. % of the halogen species, such as not greater than about 0.250 mol. % of the halogen species, not greater than about 0.188 mol. % of the halogen species, and even not greater than about 0.150 mol. % of the halogen species, such as not greater than about 0.125 mol. % of the halogen species. However, in most applications the sorbent composition will include at least about 0.00625 mol. % of the halogen species, such as at least about 0.0125 mol. % of the halogen species, at least about 0.025 mol. % of the halogen species, or even at least about 0.0375 mol. % of the halogen species.

The method may include the addition of other additives to the sorbent composition, e.g., to enhance other characteristics of the sorbent composition. For example, the method may include adding an acid gas agent to the sorbent composition. Alternatively, or in addition to an acid gas agent, a flow aid may be added to the sorbent composition. In addition, a catalytic component such as a catalytic metal may be added to the sorbent composition. Such acid gas agents, flow aids and catalytic components are discussed in more detail below.

The present disclosure is also directed to a sorbent composition that is particularly useful for the sequestration of contaminants, e.g., heavy metals, from a fluid stream, particularly where the contaminant is oxidized by a halogen to facilitate its removal, e.g., in the removal of mercury from a flue gas stream. The sorbent composition includes a solid sorbent and a halogen species that is associated with the solid sorbent, where the halogen species is in a substantially amorphous (e.g., non-crystalline) form on the solid sorbent. Although the sorbent compositions disclosed herein may be prepared by the foregoing methodology, e.g., where the halogen species is formed by contacting halide salt(s) with an acid, it is to be understood that the sorbent compositions disclosed and claimed herein are not limited to those prepared by this specific method.

As used herein, the term amorphous refers to the fact that the halogen species has no clearly defined shape or form on the solid sorbent. This is in contrast to a halogen species that has a clearly defined form (e.g., morphology) on the solid sorbent, particularly a substantially crystalline form that can be readily detected using techniques such as X-Ray Diffraction (XRD). Thus, when the sorbent compositions according to the present disclosure are analyzed using XRD, the diffraction pattern does not show the relatively sharp diffraction peaks that are characteristic of a crystalline solid that includes the halogen. For example, if the halogen species is bromine and the bromine is derived from sodium bromide, the XRD pattern will not contain the relatively sharp peaks that are associated with the presence of crystalline sodium bromide.

As is discussed above, the sorbent composition may be prepared by the methods disclosed above. That is, the halogen species may be formed by contacting one or more halide salts with an acid, e.g., with an acidic solution. When the halogen species is formed by contacting the halide salt with an acid, the halogen species may be dispersed within the acid when the halogen species is associated with the solid sorbent. For example, the halogen species may be dispersed within an acid that partly or substantially completely coats the solid sorbent. As is discussed above, the acid may be an organic acid or a mineral acid, and in particular embodiments the acid is a mineral acid. The mineral acid may be selected from the group consisting of sulfuric acid, phosphoric acid, nitric acid and hydrochloric acid, as well as combinations of these acids. Among these, sulfuric acid and phosphoric acid may be particularly useful.

Thus, the halogen species may be dispersed in combination with a mineral acid on the surface of the solid sorbent. When the halogen species is dispersed in combination with a mineral acid, the sorbent composition may also include a conjugate salt of the mineral acid, i.e., may include an anion contributed by the acid. Such anions contributed by the acid may include polyatomic or monoatomic ions, for example sulfate ($SO_4^{2-}$), bisulfate ($HSO_4^-$), phosphate ($PO_4^{3-}$), hydrogen phosphate ($HPO_4^{2-}$), dihydrogen phosphate ($H_2PO_4^-$), nitrate ($NO_3^-$) and chloride ($Cl^-$) anions. For example, when the mineral acid comprises sulfuric acid ($H_2SO_4$), the sorbent composition may include sulfate and/or bisulfate anions. In another example, when the mineral acid comprises phosphoric acid ($H_3PO_4$), the sorbent composition may include phosphate, hydrogen phosphate and/or dihydrogen phosphate anions.

The halogen species may include a halogen element such as fluorine, chlorine, bromine and/or iodine. In one example, the halogen species is selected from the group consisting of bromine, chlorine, iodine and combinations thereof. Bromine may be particularly useful in the sorbent compositions disclosed herein, such as for the oxidation of heavy metal contaminants. In other examples, iodine may be particularly useful in the sorbent composition, particularly in relatively low concentrations. As is noted above, the halogen species may be formed by contacting one or more halide salts with an acid. Such halide salts will typically comprise a halogen anion and a cation. For example, the cation may be selected from lithium, sodium, potassium, calcium, magnesium, ammonium, alkyl ammonium, and/or hydrogen. As a result, these cations may also be present in the sorbent composition, i.e., on the solid sorbent. In one particular example, the halogen species includes bromine and the halogen species is derived from sodium bromide and/or ammonium bromide. Thus, when sodium bromide is utilized, the halogen species will comprise bromine and the sorbent composition will also include sodium. When ammonium bromide is utilized, the halogen species will comprise bromine and the sorbent composition will also include ammonium. In another particular embodiment, the halogen species includes iodine and the halogen species is derived from potassium iodide.

As is discussed above, it is an advantage of the sorbent compositions disclosed herein that the compositions may have an adequate efficacy (e.g., for mercury removal from a flue gas stream) at relatively low concentrations of the halogen species. Characterized another way, at the same concentration of halogen species, the sorbent compositions disclosed herein may have an improved efficacy in relation to known sorbents, i.e., sorbents where the halide salt has not been exposed to an acid. In one example, the sorbent composition includes not greater than about 30 wt. % of the halogen species, such as not greater than about 20 wt. % of the halogen species, not greater than about 15 wt. % of the halogen species, and even not greater than about 12 wt. % of the halogen species. However, in most applications the sorbent composition will include at least about 0.5 wt. % of the halogen species, such as at least about 1.0 wt. % of the halogen species, at least about 2.0 wt. % of the halogen species, or even at least about 5.0 wt. % of the halogen species. As is noted above, when the halogen species includes iodine, the sorbent composition may advantageously include not greater than about 5 wt. % iodine, such as not greater than about 4 wt. % iodine and even not greater than about 3 wt. % iodine.

Because the type and nature of the halogen species may vary, it is also useful to consider the concentration of the halogen species in terms of the molar concentration of the halogen. In this regard, the sorbent composition may include not greater than about 0.375 mol. % of the halogen species, such as not greater than about 0.250 mol. % of the halogen species, not greater than about 0.188 mol. % of the halogen species, and even not greater than about 0.150 mol. % of the halogen species, such as not greater than about 0.125 mol. % of the halogen species. However, in most applications the sorbent composition will include at least about 0.00625 mol. % of the halogen species, such as at least about 0.0125 mol. % of the halogen species, at least about 0.025 mol. % of the halogen species, or even at least about 0.0375 mol. % of the halogen species.

The sorbent composition may also include moisture (e.g., water) on the surface of the solid sorbent. It is believed that some level of moisture is desirable to help solubilize the oxidized mercury and facilitate its transport into the sorbent pores. In this regard, the moisture may be acidic (i.e., an acidic solution) when the halogen species is derived by contacting a halide salt with an acid. In this regard, it may be advantageous to ensure that the sorbent composition includes at least about 3 wt. % moisture, such as at least about 8 wt. % moisture. However, it is believed that moisture levels in excess of about 15 wt. % may be detrimental to overall sorbent behavior, such as flow of the sorbent composition during conveyance of the sorbent composition. The moisture level may be controlled by utilizing a drying step after the solid sorbent has been contacted with the acidic halogen solution from which the halogen species is derived, and controlling the time and/or temperature of the drying step.

The solid sorbent may be selected from known sorbents that are useful for the sequestration of contaminants from a fluid stream. Particular examples of such solid sorbents that may be useful in accordance with the present disclosure include alumina, silica, silicates and carbonaceous materials. In particular embodiments, the solid sorbent includes a carbonaceous material, such as a carbonaceous material that is derived from coal. In one example, the carbonaceous material is derived from lignite coal, and in another particular example the solid sorbent includes powdered activated carbon.

As is discussed above, the median average particle size (D50) of the solid sorbent may be relatively small, particularly when the sorbent composition is engineered for the capture of mercury or other heavy metal contaminants from a flue gas stream. In one characterization, the median average particle size of the solid sorbent is not greater than about 50 µm, such as not greater than about 30 µm, or even not greater than about 25 µm. For some applications such as the sequestration of mercury from a flue gas stream, it may be desirable to utilize a solid sorbent having a median average particle size of not greater than about 20 µm, not greater than about 15 µm and even not greater than about 12 µm. Characterized in another way, the median particle size may be at least about 5 µm, such as at least about 6 µm, or even at least about 8 µm. The increased surface area may result in many benefits, including, but not limited to, increased exposure of the mercury to the halogen species associated with the solid sorbent surface, increased area available for reactions to occur, and thus overall improved reaction kinetics. Generally speaking, the presence of the halogen species will not substantially alter the particle size of the solid sorbent, and the median particle size of the solid sorbent may be considered as equivalent to the median particle size of the sorbent composition.

The solid sorbent (e.g., PAC) may also have a relatively high total pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

In this regard, the total pore volume of the solid sorbent (sum of micropore volume plus mesopore volume plus macropore volume) may be at least about 0.10 cc/g, such as at least 0.20 cc/g, at least about 0.25 cc/g or even at least about 0.30 cc/g. The micropore volume of the sorbent may be at least about 0.10 cc/g, such as at least about 0.15 cc/g. Further, the mesopore volume of the sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume may advantageously enable efficient capture and sequestration of oxidized mercury species by the solid sorbent.

In another characterization, the solid sorbent has a relatively high surface area. For example, the solid sorbent may have a surface area of at least about 350 $m^2/g$, such as at least about 400 $m^2/g$ or even at least about 500 $m^2/g$. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material.

In accordance with the foregoing, the sorbent composition includes at least one halogen species that is associated with the solid sorbent, where the at least one halogen species is in a substantially amorphous form on the solid sorbent. In some examples, the sorbent composition includes more than one halogen species on the solid sorbent. Thus, the sorbent composition may include at least a second halogen species on the solid sorbent in addition to a first halogen species that is in substantially amorphous form. The second halogen species may also be in a substantially amorphous form, i.e., where the second halogen species is also derived from contacting a halide salt (e.g., a second halide salt) containing the second halogen with an acid. In another example, the second halogen species exists in a crystalline or partially crystalline form on the solid sorbent. For example, a sorbent composition may be formed that includes a halogen species in a substantially amorphous form on the solid sorbent as is discussed above. Thereafter, a second halogen species may be introduced to the sorbent composition, such as by dry admixing the sorbent composition with a second halide salt. Thus, the sorbent composition will include the amorphous halogen species and will also include a second halogen species that is in the form of the second halide salt.

The sorbent compositions disclosed herein may include other additives, e.g., additives for improving the efficacy of the sorbent compositions when applied in different operating conditions. Merely by way of example, the sorbent composition may also include an acid gas agent that is selected to improve the efficacy of the sorbent composition in the presence of acid gases, such as those that might be found in a flue gas stream emanating from a coal-fired boiler. For example, the acid gas agent may include one or more of aluminum hydroxide, zinc oxide, ammonium sulfate, ammonium bisulfate, ammonium carbonate, ammonium bicarbonate, sodium carbonate, sodium bicarbonate, magnesium hydroxide, magnesium carbonate, magnesium bicarbonate, urea, urea derivatives, metal hydroxides, and ammonium compounds. In one particular example, the sorbent composition includes aluminum hydroxide as an acid gas agent. The sorbent composition may include, for example, at least about 1 wt. % of the acid gas agent and not greater than about 20 wt. % of the acid gas agent.

In another example, the sorbent composition also includes a flow aid that is selected to improve the flowability of the sorbent composition, such as during the pneumatic transport of the sorbent composition. Exemplary flow aids include graphites, micas, talcs, silicas, stearates, clays and diatomaceous earth. In particular examples, the flow aid includes graphite and/or mica.

In another example, the sorbent composition may include an ancillary catalyst component comprising at least one constituent selected from the group consisting of a catalytic metal, a precursor to a catalytic metal, a catalytic metal compound, a precursor to a catalytic metal compound and combinations thereof. For example, the catalyst component may include a catalytic metal or a precursor to a catalytic metal, where the catalytic metal is selected from the group consisting of Fe, Cu, Mn, Pd, Au, Ag, Pt, Ir, V, Ni, Zn, Sn, Ti, Ce, and combinations thereof. In one particular characterization, the catalytic metal may be selected from the group consisting of Fe, Cu, Mn, Zn and combinations thereof. The catalytic metal may be present in the sorbent composition in the range of from about 0.001 wt. % to about 20 wt. %.

Other additives to sorbent compositions that are known to those skilled in the art may be included within the sorbent compositions disclosed herein without departing from the scope of the present disclosure.

The sorbent compositions disclosed herein are particularly useful for the treatment of a flue gas stream to remove contaminants from the flue gas stream. The sorbent compositions are particularly useful for the sequestration of mercury from a flue gas stream containing the mercury. Thus, the present disclosure also encompasses a method for the treatment of a flue gas stream to remove contaminants from the flue gas stream by contacting the flue gas stream with a solid sorbent composition such as those disclosed herein.

For example, the method may include the combusting of a fuel, where the combusting of the fuel generates a flue gas stream that includes at least one contaminant contained in the flue gas stream. The flue gas stream is contacted with a solid sorbent composition, where the solid sorbent composition upon contacting the flue gas stream oxidizes at least a portion of the contaminant to form an oxidized contaminant. After contacting the flue gas stream with the solid sorbent composition the solid sorbent composition is separated from the flue gas stream. The solid sorbent composition includes a solid sorbent and a halogen species associated with the solid sorbent, where the halogen species is in a substantially amorphous form on the solid sorbent, and wherein the solid sorbent sequesters the oxidized contaminant. In particular, the solid sorbent composition may be embodied by the solid sorbent compositions described in detail above.

By way of example, FIG. 1 schematically illustrates a flue gas train and method for removal of heavy metals such as mercury from a flue gas stream produced by a coal-burning power plant using activated carbon injection (ACI) to contact a sorbent composition with the flue gas stream. Coal 101 or other fuel source is introduced into a boiler 102 and the combustion of the coal 101 produces a flue gas stream 103. The flue gas stream 103 exits the boiler 102 and may then proceed through a flue gas train that includes an air heater unit (AH) 104 where the temperature of the flue gas stream 103 is reduced and heat values within the overall system are conserved. The flue gas train may include a separation unit 105 through which the flue gas stream 103 traverses to remove particulate matter from the flue gas. For example, the separation unit 105 may comprise an electrostatic precipitator (ESP) and/or a fabric filter for the removal of particulate matter before the treated flue gas exits out a stack 106. For example, a cold-side (i.e., after the air heater unit) electrostatic precipitator can be used, as is illustrated in FIG. 1. It will be appreciated by those skilled in the art that the flue gas train may include other devices not illustrated in FIG. 1, such as a selective catalytic reduction unit (SCR) and the like, and may have numerous other configurations.

To sequester and remove heavy metals from the flue gas, a sorbent composition as disclosed herein may be introduced (e.g., injected into) to the flue gas stream 103 either before 107A or after 107B the air heater unit 104, but before the separation unit 105 which will remove the solid sorbent composition from the flue gas.

While the separation unit 105 may be selected from a number of devices, including an ESP or a fabric filter bag house, the sorbent composition disclosed herein may be particularly useful for removing mercury from the flue gas stream 103 when an ESP is utilized as the separation unit 105. For example, the separation unit 105 can be a cold-side ESP. While ESP units generally have a lower capital cost than a fabric filter bag house unit, fabric filter bag house units are often utilized to increase the contact time between the sorbent composition and the flue gas stream because the unit traps the sorbent composition and the flue gas continues to pass through the sorbent composition on the filter until the filter is rapped to remove the sorbent and other trapped materials. Such resident times are often deemed necessary to adequately capture mercury from the flue gas stream with temperatures of less than about 350° F. However, utilizing the sorbent compositions disclosed herein, which may provide rapid oxidation of the mercury species, even very short residence times (e.g., the contact times) between the flue gas stream and the sorbent composition may be sufficient to remove at least about 85% of the mercury from the flue gas, such as at least about 90% of the mercury from the flue gas. In this regard, the residence time of the sorbent composition in the flue gas stream may be not greater than about 5 seconds, such as not greater than about 3 seconds or even not greater than about 1 second.

EXAMPLES

Comparative Example 1

A first comparative sample (Comparative Sample A) is obtained for comparison to the sorbent compositions disclosed herein. Sample A is a commercial sorbent that is sold under the mark FastPAC® by ADA Carbon Solutions, LLC Littleton, Colo. Sample A comprises a powdered activated carbon (PAC) that is derived from a lignite coal feedstock. Sample A has a median particle size (D50) of about 15 µm, a fixed carbon content of about 50 wt. %, a mineral content of about 40 wt. %, and a total pore volume of at least about 0.25 cc/g.

Comparative Example 2

A second comparative sample (Comparative Sample B) is a brominated PAC sorbent wherein the bromine is added to the PAC via impregnation using an aqueous solution of sodium bromide (NaBr). Comparative Sample B is known to be effective for mercury removal from a flue gas stream. Comparative Sample B is prepared by spraying a solution of sodium bromide onto 50 g of Comparative Sample A over a period of about 5 minutes while the PAC is fluidized in a mixing vessel. After a total mixing period of about 5 minutes, the composition is dried at 150° C. until a moisture level of about 8 wt. % is attained. The bromine concentration on Comparative Sample B is measured to be about 5.6 wt. %.

Comparative Example 3

A third comparative sample (Comparative Sample C) is a brominated PAC sorbent where the bromine is added to the PAC via impregnation using an aqueous solution of ammonium bromide. Such a composition is known to be effective for mercury removal from flue gas. Comparative Sample C is prepared by spraying a solution of ammonium bromide onto 50 g of Comparative Sample A over a period of about 5 minutes while the carbon is fluidized in a mixing vessel. The bromine concentration on Comparative Sample C is measured to be about 5.1 wt. %.

Example 4

Sample D in accordance with the present disclosure is prepared in the following manner. Sodium bromide is dissolved in deionized (DI) water to form a sodium bromide solution. Thereafter, 85 wt. % phosphoric acid ($H_3PO_4$) is slowly added to the sodium bromide solution with stirring. The resulting acidic halogen solution comprises 22.4 wt. % bromine and has a phosphoric acid to sodium bromide molar ratio of about 1:1. About 14 g of this acidic halogen solution is sprayed onto about 50 g of Comparative Sample A over a period of about 5 minutes while Comparative Sample A is fluidized in a mixing vessel. After a further 5 minutes of mixing, the sorbent composition is dried at about 150° C. until a moisture level of about 8 wt. % is attained. The bromine concentration on Sample D is measured to be about 5.3 wt. %.

Example 5

Sample E in accordance with the present disclosure is prepared in the following manner. Ammonium bromide ($NH_4Br$) is dissolved in DI water to form an ammonium bromide solution. 85 wt. % phosphoric acid is slowly added to the ammonium bromide solution with stirring. The resulting acidic halogen solution contains about 21.1 wt. % Br and has a phosphoric acid to ammonium bromide molar ratio of about 1:1. Thereafter, about 15 g of the acidic halogen solution is sprayed onto 50 g of Comparative Sample A over a period of about 5 minutes while Comparative Sample A is fluidized in a mixing vessel. After an additional 5 minutes of mixing, the sorbent composition is dried at about 150° C. until a moisture level of about 8% is attained. The bromine concentration on Sample E is measured to be about 5.4 wt. %.

Example 6

Sample F in accordance with the present disclosure is prepared in the following manner. Sodium bromide is dissolved in DI water to form a sodium bromide solution. 85 wt. % phosphoric acid is slowly added to the sodium bromide solution with stirring. The resulting acidic halogen solution contains about 27.8 wt. % Br and has a phosphoric acid to sodium bromide molar ratio of about 1:2. Thereafter, about 10.2 g of the acidic halogen solution is sprayed onto about 50 g of Comparative Sample A over a period of about 5 minutes while Comparative Sample A is fluidized in a mixing vessel. After an additional 5 min of mixing, the sorbent composition is dried at about 150° C. until a moisture level of about 8% is attained. The bromine concentration on Sample F is measured to be about 5 wt. %.

Example 7

Sample G in accordance with the present disclosure is prepared in the following manner. Ammonium bromide is dissolved in DI water. 85 wt. % phosphoric acid is slowly added to this ammonium bromide solution with stirring. The resulting acidic halogen solution contains 27.1 wt. % bromine and has a phosphoric acid to ammonium bromide molar ratio of about 1:2.25. Thereafter, about 11 g of the acidic halogen solution is sprayed onto about 50 g of Comparative Sample A over a period of about 5 minutes while Comparative Sample A is fluidized in a mixing vessel. After an additional ~5 minutes of mixing, the sorbent composition is dried at about 150° C. until a moisture level of about 8% is attained. The bromine concentration on Sample G is measured to be about 5.3 wt. %.

Example 8

Sample H in accordance with the present disclosure is prepared in the following manner. Sodium bromide is dissolved in DI water to form a sodium bromide solution. 85 wt. % phosphoric acid is slowly added to the sodium bromide solution with stirring. The resulting acidic halogen solution contains about 30.8 wt. % Br and has a phosphoric acid to sodium bromide molar ratio of about 1:4. About 9.2 g of this acidic halogen solution is sprayed onto about 50 g of Comparative Sample A over a period of about 5 minutes while Comparative Sample A is fluidized in a mixing vessel. After an additional ~5 min of mixing, the sorbent composition is dried at about 150° C. until a moisture level of about 8% is attained. The bromine concentration on Sample H is measured to be about 5 wt. %.

Example 9

Sample I in accordance with the present disclosure is prepared in the following manner. Sodium bromide is dissolved in DI water to form a sodium bromide solution. 50 vol. % sulfuric acid ($H_2SO_4$) is added to the sodium bromide solution slowly with stirring. The resulting acidic halogen solution contains about 21 wt. % bromine and has a sulfuric acid to sodium bromide molar ratio of about 1:1. About 17.7 g of this acidic halogen solution is sprayed onto about 50 g of Comparative Sample A over a period of about 5 minutes while Comparative Sample A is fluidized in a mixing vessel. After an additional ~5 minutes of mixing, the sorbent composition is dried at about 150° C. until a moisture level of about 8% is attained. The bromine concentration on Sample I is measured to be about 6.3 wt. %.

Example 10

Sample J in accordance with the present disclosure is prepared in the following manner. Ammonium bromide is dissolved in DI water to form an ammonium bromide solution. 50 vol. % sulfuric acid is slowly added to the ammonium bromide solution with stirring. The resulting acidic halogen solution contains about 19.4 wt. % bromine and has a sulfuric acid to ammonium bromide molar ratio of about 1:1. About 30 g of this acidic halogen solution is sprayed onto about 50 g of Comparative Sample A over a period of about 5 minutes while Comparative Sample A is fluidized in a mixing vessel. After an additional ~5 minutes of mixing, the sorbent composition is dried at about 150° C. until a moisture level of about 8% is attained. The bromine concentration on Sample J is measured to be about 10.2 wt. %.

The ability to capture mercury may be measured by a dynamic mercury index (DMI) test developed by ADA Carbon Solutions, LLC and that measures mercury (Hg) captured in micro-grams of Hg per gram of sorbent composition (μg Hg/g sorbent composition) in a flowing mercury-laden gas stream at elevated temperatures. An increase in, or higher DMI, or μg Hg/g carbon (μg/g) captured, is an indication of a higher mercury capture efficiency of a sorbent. The DMI test simulates conditions in a coal burning facility's flue gas stream. The test system includes a pre-heater, sorbent feed, mercury feed, and reaction chamber. The mercury is fed into a reactor chamber along with the sorbent composition, wherein they are entrained. Uncaptured mercury is analyzed and DMI calculated. Temperature of the entrained mercury and sorbent is kept at about 325° F. (163° C.). Air entrainment and injection rates of between about 1 and about 5 lb./MMacf (pounds sorbent per one million actual cubic feet) are maintained such that residence time of the sorbent in the reaction chamber is about one second to simulate electrical generation unit (EGU) facility conditions. The mercury concentration in the system is approximately 10 μg/m³.

Each of Samples A-J is measured to determine its DMI, and the results are listed in Table I.

TABLE I

Mercury Capture Performance

| Sample | Halogen | Halogen Treatment | DMI (ug Hg/g sorbent) |
|---|---|---|---|
| Comparative Sample A | None | N/A | 20 |
| Comparative Sample B | 5.6 wt. % Br from NaBr | Conventional | 308 |
| Comparative Sample C | 5.1 wt. % Br from NH$_4$Br | Conventional | 413 |
| Sample D | 5.3 wt. % Br from NaBr | Acidic Solution (H$_3$PO$_4$) | 575 |
| Sample E | 5.4 wt. % Br from NH$_4$Br | Acidic Solution (H$_3$PO$_4$) | 588 |
| Sample F | 5.0 wt. % Br from NaBr | Acidic Solution (H$_3$PO$_4$) | 464 |

TABLE I-continued

Mercury Capture Performance

| Sample | Halogen | Halogen Treatment | DMI (ug Hg/g sorbent) |
|---|---|---|---|
| Sample G | 5.3 wt. % Br from NH$_4$Br | Acidic Solution (H$_3$PO$_4$) | 683 |
| Sample H | 5.0 wt. % Br from NaBr | Acidic Solution (H$_3$PO$_4$) | 433 |
| Sample I | 6.3 wt. % Br from NaBr | Acidic Solution (H$_2$SO$_4$) | 486 |
| Sample J | 10.2 wt. % Br from NH$_4$Br | Acidic Solution (H$_2$SO$_4$) | 424 |

The performance of a sorbent composition prepared from an acid-treated halide salt solution is found to be at least 25% to 50% higher in terms of overall mercury sequestration compared to a composition consisting of the same source and concentration of halide salt applied to the same base sorbent without the benefit of acid pre-treatment.

Example 11

A prior art brominated PAC sorbent composition is compared to sorbent compositions in accordance with the present disclosure by evaluating the samples using x-ray diffraction (XRD). Sample K is formed by spraying about 50 g of Comparative Sample A with about 25.5 g of an acidic halogen solution comprising phosphoric acid and sodium bromide in a molar ratio of about 1:1 (acid to sodium bromide). The acidic halogen solution is sprayed onto Comparative Sample A while Comparative Sample A is fluidized in a mixer. The resulting sorbent composition is then dried at about 150° C. for about two hours.

Comparative Sample L is made by a prior art process of spraying a sodium bromide solution onto about 50 g of Comparative Sample A. This is achieved by spraying the sodium bromide solution onto Comparative Sample A while Comparative Sample A is fluidized in a mixer. The resulting composition is then dried at about 150° C. for about two hours. The bromide content of the samples is measured to be about 10.8 wt. % for Sample K and about 11.9 wt. % for Comparative Sample L.

Figure 2:
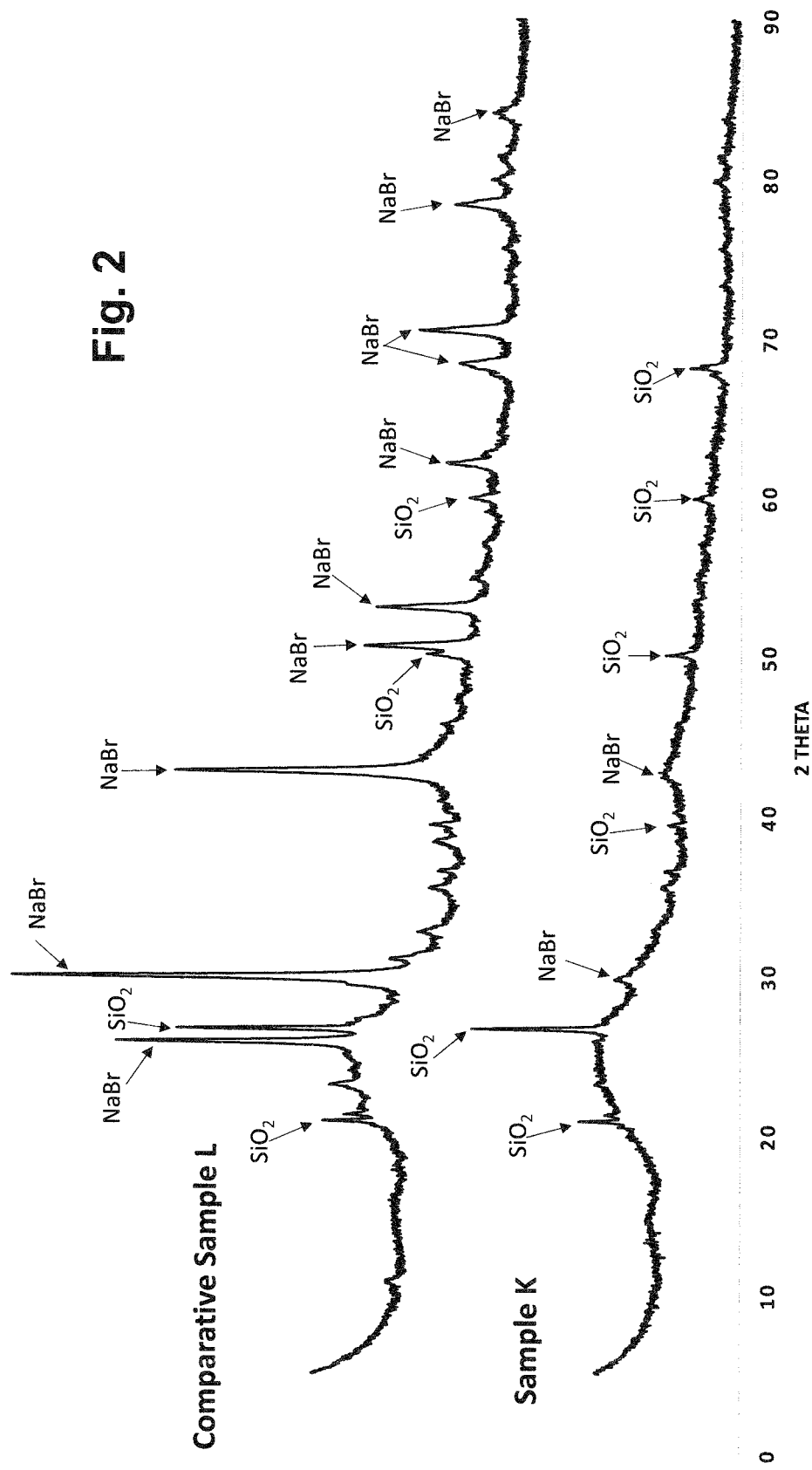
FIG. 2 illustrates x-ray diffraction patterns for a conventional sorbent composition and a sorbent composition according to the present disclosure.

Sample K and Sample L are analyzed by XRD to detect the presence of crystalline sodium bromide on the solid PAC sorbent. FIG. 2 shows the XRD spectra of both Sample K and Sample L. The presence of crystalline sodium bromide in Comparative Sample L is apparent from the number of sharp peaks that indicate the presence of crystalline sodium bromide. By comparison, crystalline sodium bromide peaks are substantially absent in the XRD spectrum of Sample K, indicating that the halogen species in the Sample K sorbent composition, resulting from an acidic halogen solution of an acid and a halogen species derived from a halide salt, is in a substantially non-crystalline (e.g., amorphous) form.

Example 12

To further demonstrate the advantages of the sorbent compositions disclosed herein, water leachability tests are performed and the degree of halogen (e.g., bromine) leaching is measured. For a leachability test, Sample K and Comparative Sample L are dried at about 150° C. for about 2 hours. Comparative Sample L is a conventionally brominated PAC that is produced in a manner similar to that described above with respect to Comparative Sample B. About 10 g of each dried sample is then slurried in about 250 ml DI water, and stirred at about 200 rpm for about 1 hour. The two samples are then filtered from the aqueous slurry and dried at about 150° C. for about 2 hours. X-Ray Fluorescence (XRF) is conducted on both samples to measure the pre-leaching and post-leaching bromine concentrations. The data is summarized in Table II.

TABLE II

Sorbent Leaching Tests

| Sample | Pre-Leach Br Concentration | Post-Leach Br Concentration | Br Loss % |
|---|---|---|---|
| Comparative Sample L | 11.92 wt. % | 0.92 wt. % | 92 |
| Sample K | 10.79 wt. % | 3.75 wt. % | 65 |

Sample K shows significantly less bromine loss due to leaching as compared to Comparative Sample L. While not wishing to be bound by any theory, these results indicate that the halogen species (e.g., Br) in the two samples is attached to the underlying solid sorbent via different mechanisms. These results indicate that the halogen species in Comparative Sample L (e.g., NaBr crystallites) may be water soluble and readily leached from the sorbent, whereas the halogen species in Sample K (e.g., an amorphous form of Br) may be more strongly bound or otherwise more permanently associated with the solid sorbent surface and therefore not as susceptible to leaching. Leaching of the halogen from the sorbent may be a concern, particularly when the sorbent is collected from the flue gas stream with fly ash.

Example 13

To demonstrate the efficacy of using iodine as an acid-activated halogen species, several samples are prepared that include iodine, either alone or in combination with bromine.

For the preparation of these samples, a solution is formed comprising about 37.2 wt. % potassium iodide (28.4 wt. % iodine), about 21.8 wt. % phosphoric acid, and about 41 wt. % deionized water. The solution includes potassium iodide and phosphoric acid in about a 1:1 molar ratio and has a pH of about −0.55 and analysis shows that the solution comprises HI with a small amount of $I_2$. This solution is sprayed onto Comparative Sample A while Comparative Sample A is fluidized in a mixing vessel. The sorbent composition is dried at about 150° C. to reduce the moisture level. Three samples are prepared having iodine concentrations of about 1 wt. %, 2 wt. %, 3 wt. % and 5 wt. %. X-ray diffraction analysis shows no detectable presence of crystalline iodide forms on the carbon.

Figure 3:
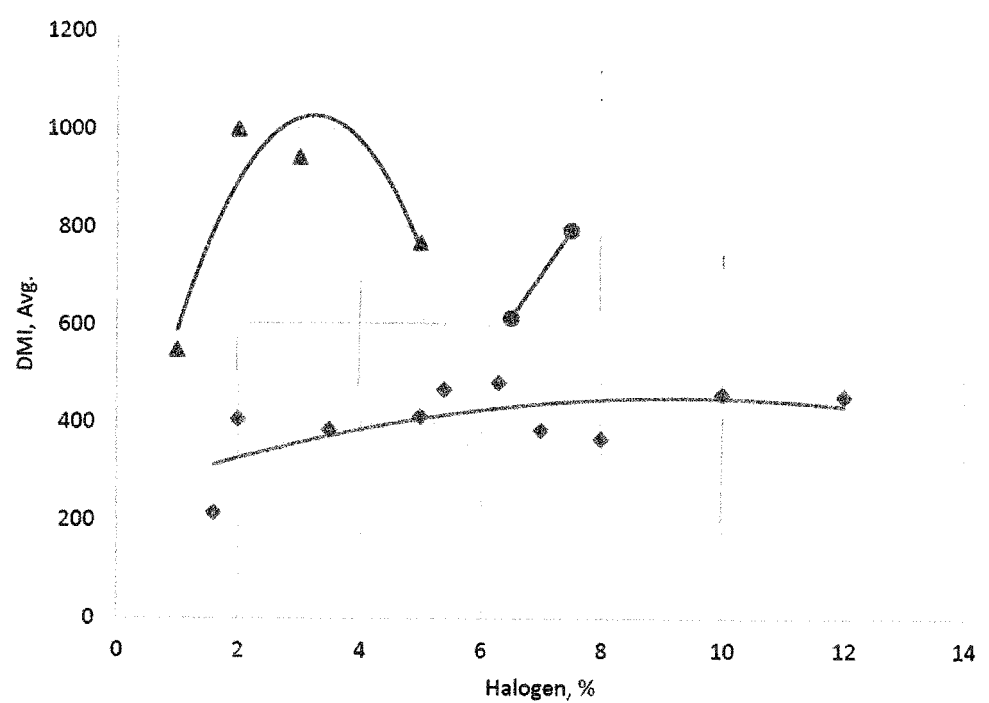
FIG. 3 is a data plot illustrating the efficacy of certain sorbent compositions disclosed herein for the removal of mercury from a flue gas stream.

DMI test as described above are performed and the results are graphically illustrated in FIG. 3 (triangular data points). As is seen in FIG. 3, even at the very low concentration of 1 wt. % iodine, almost 600 ug Hg/g sorbent is captured. Increasing the concentration to 2 wt. % or 3 wt. % increases the efficacy of the sorbent to about 950 to about 1000 ug Hg/g sorbent. Also represented in FIG. 3 are two samples (circular data points) where a brominated PAC with about 5 wt. % Br is similarly treated with 1 wt. % iodine and 2 wt. % iodine. The sample with 1 wt. % iodine showed a DMI value of just over 600 ug Hg/g sorbent, and the sample with 2 wt. % iodine showed a DMI value of about 800 ug Hg/g sorbent.

While various embodiments of a sorbent composition, a method for making a sorbent composition and a method of using a sorbent composition have been described in detail, it is apparent that modifications and adaptations of those embodiments will occur to those skilled in the art. However, is to be expressly understood that such modifications and adaptations are within the spirit and scope of the present disclosure.

What is claimed is:

1. A sorbent composition comprising:
   a solid sorbent having a median (D50) average particle size of not greater than about 30 μm;
   at least about 0.5 wt. % of a halogen species that is in a substantially amorphous form on the solid sorbent;
   a cation selected from the group consisting of lithium, sodium, potassium, calcium, magnesium, and combinations thereof; and
   a polyatomic anion selected from the group consisting of phosphate, hydrogen phosphate, dihydrogen phosphate, and combinations thereof,
   wherein the sorbent composition is formed by contacting the solid sorbent with an acidic halogen solution comprising an acid comprising phosphoric acid, the halogen species, and the cation.

2. The sorbent composition recited in claim 1, wherein a ratio of the halogen species to the phosphoric acid in the acidic halogen solution is at least about 1:2 and not greater than about 10:1.

3. The sorbent composition recited in claim 1, wherein the halogen species comprises one or more of bromine, chlorine, and iodine, and wherein the sorbent composition is essentially free of a halide salt that is in a crystalline form.

4. The sorbent composition recited in claim 3, wherein the halogen species comprises bromine.

5. The sorbent composition recited in claim 3, wherein the halogen species comprises iodine.

6. The sorbent composition recited in claim 1, wherein the halogen species and the cation are derived from sodium bromide.

7. The sorbent composition recited in claim 1, wherein the sorbent composition comprises at least about 5 wt. % of the halogen species.

8. The sorbent composition recited in claim 1, wherein the sorbent composition comprises not greater than about 30 wt. % of the halogen species.

9. The sorbent composition recited in claim 1, wherein the sorbent composition comprises not greater than about 15 wt. % of the halogen species.

10. The sorbent composition recited in claim 1, wherein the halogen species and the cation are derived from potassium iodide.

11. The sorbent composition recited in claim 1, wherein the sorbent composition comprises at least about 3 wt. % moisture.

12. The sorbent composition recited in claim 1, wherein the sorbent composition comprises at least about 8 wt. % moisture.

13. The sorbent composition recited in claim 1, wherein the sorbent composition comprises not greater than about 15 wt. % moisture.

14. The sorbent composition recited in claim 1, wherein the solid sorbent is selected from the group consisting of aluminas, silicas, silicates, carbonaceous materials, and combinations thereof.

15. The sorbent composition recited in claim 14, wherein the solid sorbent comprises a carbonaceous material.

16. The sorbent composition recited in claim 15, wherein the carbonaceous material is derived from coal.

17. The sorbent composition recited in claim 16, wherein the carbonaceous material is derived from lignite coal.

18. The sorbent composition recited in claim 15, wherein the solid sorbent comprises powdered activated carbon.

19. The sorbent composition recited in claim 1, wherein the solid sorbent has a median average particle size (D50) of not greater than about 15 μm.

20. The sorbent composition recited in claim 1, wherein the solid sorbent has a total pore volume of at least about 0.2 cc/g.

21. The sorbent composition recited in claim 1, wherein the solid sorbent has a surface area of at least about 350 m$^2$/g.

22. The sorbent composition recited in claim 1, wherein the sorbent composition further comprises at least a second halogen species associated with the solid sorbent.

23. A sorbent composition comprising:
a solid sorbent having a median (D50) average particle size of not greater than about 30 μm;
at least about 0.5 wt. % of a halogen species that is in a substantially amorphous form on the solid sorbent; and
a cation selected from the group consisting of lithium, sodium, potassium, calcium, magnesium, ammonium, alkyl ammonium, and combinations thereof;
wherein the sorbent composition is formed by contacting the solid sorbent with an acidic halogen solution comprising an acid comprising phosphoric acid, the halogen species, and the cation.

24. The sorbent composition recited in claim 23, wherein a ratio of the halogen species to the phosphoric acid in the acidic halogen solution is at least about 1:2 and not greater than 10:1.

25. The sorbent composition recited in claim 23, wherein the halogen species comprises one or more of bromine, chlorine, and iodine, and wherein the sorbent composition is essentially free of a halide salt that is in a crystalline form.

26. The sorbent composition recited in claim 23, wherein the cation is selected from the group consisting of lithium, sodium, potassium, calcium, and magnesium.

27. The sorbent composition recited in claim 23, wherein the sorbent composition comprises at least about 5 wt. % and not greater than about 30 wt. % of the halogen species.

28. The sorbent composition recited in claim 23, wherein the solid sorbent is selected from the group consisting of aluminas, silicas, silicates, carbonaceous materials, and combinations thereof.

29. A sorbent composition comprising:
a solid sorbent having a median (D50) average particle size of not greater than about 30 μm;
at least about 0.5 wt. % of a halogen species, wherein the halogen species is in a substantially amorphous form on the solid sorbent; and
a cation selected from the group consisting of lithium, sodium, potassium, calcium, magnesium, ammonium, alkyl ammonium, and combinations thereof,
wherein the sorbent composition is formed by contacting the solid sorbent with an acidic halogen solution comprising the halogen species, the cation, and a mineral acid, wherein a ratio of the halogen species to the mineral acid is at least about 1:2 and no more than 10:1.

30. The sorbent composition recited in claim 29, wherein the mineral acid comprises phosphoric acid and wherein the sorbent composition further comprises a polyatomic anion selected from the group consisting of phosphate, hydrogen phosphate, dihydrogen phosphate, and combinations thereof.

31. The sorbent composition recited in claim 29, wherein the mineral acid comprises sulfuric acid and wherein the sorbent composition further comprises a polyatomic anion selected from the group consisting of sulfate, bisulfate, and combinations thereof.

32. The sorbent composition recited in claim 29, wherein the mineral acid comprises nitric acid and wherein the sorbent composition further comprises a nitrate anion.

33. The sorbent composition recited in claim 29, wherein the halogen species comprises bromine, iodine, and combinations thereof, and wherein the sorbent composition is essentially free of a halide salt that is in a crystalline form.

34. The sorbent composition recited in claim 29, wherein the cation is selected from the group consisting of lithium, sodium, potassium, calcium, and magnesium.

35. The sorbent composition recited in claim 29, wherein the halogen species and the cation are derived from a halide salt that is selected from the group consisting of sodium bromide, ammonium bromide, potassium iodide, and combinations thereof.

36. The sorbent composition recited in claim 29, wherein the sorbent composition comprises not greater than about 30 wt. % of the halogen species.

37. The sorbent composition recited in claim 29, wherein the sorbent composition comprises at least about 5 wt. % of the halogen species.

38. The sorbent composition recited in claim 29, wherein the solid sorbent comprises powdered activated carbon.

* * * * *